(12) United States Patent
Dinkel et al.

(10) Patent No.: US 6,745,667 B1
(45) Date of Patent: Jun. 8, 2004

(54) MOTOR-PUMP AGGREGATE

(75) Inventors: Dieter Dinkel, Schwalbach (DE); Rüdiger Briesewitz, Frankfurt am Main (DE); Peter Volz, Darmstadt (DE); Hans-Dieter Reinartz, Frankfurt am Main (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 31 days.

(21) Appl. No.: 10/111,655

(22) PCT Filed: Oct. 25, 2000

(86) PCT No.: PCT/EP00/10498

§ 371 (c)(1),
(2), (4) Date: Apr. 25, 2002

(87) PCT Pub. No.: WO01/31198

PCT Pub. Date: May 3, 2001

(30) Foreign Application Priority Data

Oct. 25, 1999  (DE) .......................... 199 51 446

(51) Int. Cl.⁷ .................................... F04B 17/00
(52) U.S. Cl. .......................... 92/72; 91/491; 417/415
(58) Field of Search ....................... 91/491, 496; 92/72, 92/128, 140, 148; 417/415

(56) References Cited

U.S. PATENT DOCUMENTS 2,309,551 A * 1/1943 Trapp et al. .................. 92/72
2,547,645 A   4/1951 Horton
3,968,736 A * 7/1976 Pecorari ........................ 92/72
4,966,530 A * 10/1990 McCusker et al. .......... 417/273
5,573,386 A * 11/1996 Schmitt et al. ............... 92/148

FOREIGN PATENT DOCUMENTS

DE   196 53 638    6/1998
DE   198 06 077    6/1999
DE   198 40 048    3/2000

* cited by examiner

Primary Examiner—Edward K. Look
Assistant Examiner—Igor Kershteyn
(74) Attorney, Agent, or Firm—Rader, Fishman & Grauer PLLC

(57) ABSTRACT

The present invention relates to a motor-pump aggregate with a motor and a piston pump, more particularly for electronically controlled brake systems of motor vehicles, wherein pistons of the pump are drivable by way of an eccentric that is connected to a shaft of the motor and are connected by means of a coupling ring, and wherein the motor has a holding plate. According to the present invention, a projection is provided on the holding plate and extends until into the range of motion of the coupling ring. This provides a stop for the coupling ring, on the one hand, and an improved outlet for leakage fluid of the pump, on the other hand.

13 Claims, 2 Drawing Sheets

MOTOR-PUMP AGGREGATE

TECHNICAL FIELD

The present invention generally relates to electrically powered pumps and more particularly relates to a motor-pump assembly.

BACKGROUND OF THE INVENTION

German publication DE 196 32 167 A1 discloses a generic motor-pump aggregate which is suitable especially for electronically controlled brake systems of motor vehicles and comprises an electric motor with a holding plate, e.g. for contact brushes, and a piston pump, wherein pistons of the pump are drivable by means of an eccentric. In this publication, the pistons are respectively urged against the eccentric by means of a resetting spring and thus follow the eccentric's movements.

It is generally known in the art, however, that a coupling ring which is connected to the pistons may be used instead of the resetting springs. In the event of e.g. two opposite pistons, one piston executes a pressure stroke movement due to the eccentric, while the other piston that is retracted by the coupling ring executes a suction stroke movement. This means that the coupling ring does not rotate along with the eccentric but oscillates. Twisting of the coupling ring may occur especially during start of the pump, and the coupling ring may push against stationary or rotating parts of the motor-pump aggregate, whereby undesirable noise and friction is caused in particular when contact with rotating parts takes place. Shavings and other small particles which are produced thereby will also impair the operability of the motor-pump aggregate.

In the international patent application assigned publication No. WO 00/13951, which was published only after the priority date of the present patent application, a stop formed fast with the housing is therefore provided on the side of the coupling ring opposite to the motor. On the other side which faces the motor, the coupling ring may get into contact with an equalizing substance rotating with the motor shaft or the eccentric or other rotating parts during operation so that increased wear and undesirable running noise is produced at this location.

BRIEF SUMMARY OF THE INVENTION

In view of the above, an object of the present invention is to improve upon a motor-pump aggregate of the type referred to hereinabove so as to reduce running noise and friction by simple means.

According to the present invention, this object is achieved in that in a generic motor-pump aggregate a projection is additionally provided on the holding plate of the motor and extends into the range of motion of the coupling ring. This achieves a stationary stop for the coupling ring according to the present invention, and friction and possible running noises are thereby reduced. The fact that an existing component is modified also permits curtailing manufacturing costs, e.g., for a separate stop, as well as assembling costs and time.

The end of the projection itself can be used as a stop when the material has a suitable abrasive resistance. Alternatively, a separate stop or abutment for the coupling ring made from an appropriate material, e.g., sheet metal, may also be provided on the projection.

Preferably, the projection has a circular design and is arranged around the shaft of the motor which extends into the pump housing. Alternatively, the projection may also have individual segments which project into the range of motion of the coupling ring.

In motor-pump aggregates there is always the demand that the inside of the motor be free from foreign bodies. Contaminants could affect or damage the sensitive electronics of the motor, with the result of malfunction of the entire aggregate. On the one hand, these contaminants may be solid media such as dust or abraded parts. On the other hand, they also may be liquid media such as hydraulic fluid, especially brake fluid, of the pump and water or salt water that enters from the outside into the aggregate. To effectively separate the pump from the motor, a fire wall is therefore especially favorably arranged between the projection and the shaft and prevents or impedes the ingress of foreign media into the inside of the motor.

Advantageously, the fire wall can be designed integrally with the holding plate. But it is also possible that the fire wall is designed as an independent component part, e.g., integral with the separate stop.

Beside the function as a stop for the coupling ring, the projection of the holding plate which extends until into the range of motion of the coupling ring has another advantage. Leakage fluid of the pump always accumulates in the crank chamber, that means the space where the eccentric is arranged, during operation of the motor-pump aggregate. When an outlet channel for leakage fluid is provided in the housing of the pump, and especially an outlet means is arranged at the end of said channel remote from the eccentric or the crank chamber, the said fluid is allowed to discharge from the crank chamber outwards, for example, also into a controller housing in which an electronic control unit for the motor-pump aggregate can be accommodated in a fluid-tight fashion, that means, in any case isolated from the discharging leakage fluid. This drain satisfies the requirements when the motor-pump aggregate of the present invention is e.g. mounted into a motor vehicle in the manner shown in FIG. 1.

If, however, a vertical installation of the aggregate as described above is not possible, discharge of the leakage fluid is impeded. This problem exists in particular in the mounting position of the aggregate shown in FIG. 2 which is turned by 90° compared to FIG. 1. To collect the leakage fluid, an indentation is then arranged especially advantageously in the housing at the outlet channel.

When the projection has a chamfer at the outside periphery of its end facing the indentation, leakage fluid can enter easily into the slot between projection or holding plate and pump housing. This is because, preferably, another channel for leakage fluid is provided between the projection or holding plate and the housing. Due to the fact that the projection extends into the range of motion of the coupling ring according to this invention, this further channel starts already at a point that is relatively remote from the motor so that the motor's inside is better protected against the ingress of leakage fluid and other foreign bodies contained in the fluid.

When this further channel does not extend out of the pump housing, a reservoir for the leakage fluid may be provided between the pump housing and the holding plate in a favorable way for fluid collection. As an alternative, it is also possible to arrange a reservoir for leakage fluid in the motor compartment.

DETAILED DESCRIPTION OF THE PREFERRED EMBODIMENTS

Figure 1:
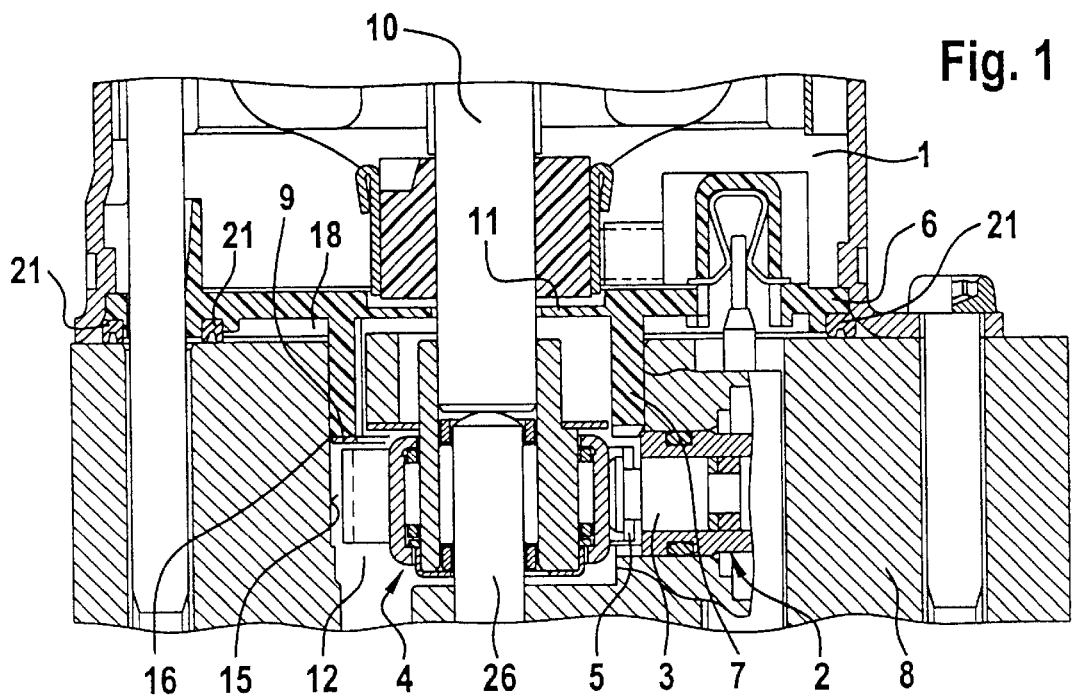
FIG. 1 is a longitudinal cross-sectional view of the motor-pump assembly of the present invention.
Figure 2:
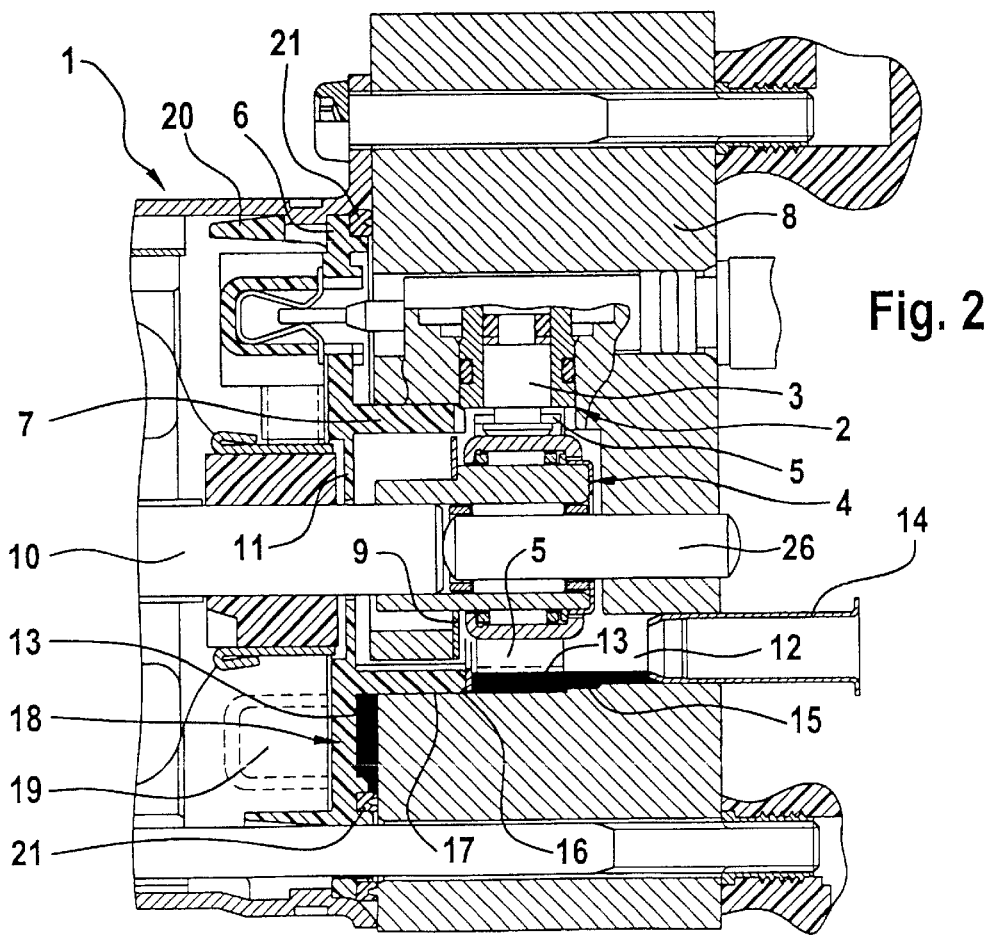
FIG. 2 is a mounting position of the aggregate of the present invention, also in a longitudinal cross-sectional view, turned by 90° compared to FIG. 1.

In the embodiments of FIGS. 1 and 2, a motor is designated by reference numeral 1 and a piston pump by reference numeral 2. Accommodated in the housing of the motor 1, which is especially configured as an electric motor, is a drive shaft 10 which extends up into a housing 8 of pump 2. Further, a holding plate 6 is interposed between the motor 1 and the pump housing 8, for example, for contact brushes (not shown) of motor 1. Attached in housing 8 of pump 2 (mentioned herein only as an example and not limiting the present invention) is a supporting axle 26 on which an eccentric 4 is arranged. Eccentric 4 which co-rotates with the shaft 10 causes pistons 3 of pump 2 to be moved to and fro radially relative to the drive shaft or shaft 10 in order to develop the pressure which is e.g. required for the operation of an electronically controlled brake system for motor vehicles. Pistons 3 are interconnected by a coupling ring 5 so that one piston 3 is induced by the eccentric 4 to execute a pressure stroke movement, while the other piston (not shown) is retracted by the coupling ring 5 and executes a suction stroke movement. This means that the coupling ring 5 does not rotate with the eccentric 4 but oscillates in the plane of motion of pistons 3. It is possible in this arrangement that the coupling ring 5 will turn about the attachment points on the pistons 3 (not shown), especially when motor 1 or pump 2 starts to operate.

To this end, a projection 7 which projects into the range of motion of the coupling ring 5 is provided on the holding plate 6 of motor 1 according to the present invention. Apart from centering the holding plate 6 in the pump housing 8, this provides a stationary stop for the coupling ring 5, whereby the friction that is produced in operation and running noises of pump 2 are reduced in a particularly favorable manner according to the present invention.

The end of the projection 7 itself can be used as a stop for the coupling ring 5 when the material has a suitable abrasive resistance. Projection 7 is manufactured jointly with the holding plate 6, in particular, from plastic material. As an alternative, however, a separate stop or abutment 9 for the coupling ring 5 may be provided on projection 7. The said stop is made of an appropriate material, for example, of sheet metal. A stop 9 of this type is explained in detail in connection with the description of FIG. 4.

Projection 7 is preferably of circular design and arranged around the shaft 10 of motor 1 which projects into the pump housing 8. Alternatively, the projection 7 may include single segments (not shown) which e.g. serve as a stop and extend until into the range of motion of the coupling ring 5.

Another issue of the present invention is the effective isolation of pump 2 or crank chamber, that means, the chamber in which the eccentric 4 is arranged, and motor 1, with the absolute need to prevent the ingress of liquid or solid media into the inside of the motor 1 in which electronic components are arranged. It is especially favorable that a fire wall 11 is provided between projection 7 and shaft 10 which prevents or impedes the ingress of foreign bodies into the inside of the motor. Fire wall 11 can be designed integrally with the holding plate 6, for example, as shown in FIGS. 1 and 2.

Beside the function as a stop for coupling ring 5, the projection 7 of holding plate 6 which extends until into the range of motion of the coupling ring 5 according to the present invention, still has another essential advantage. Leakage fluid 13 of pump 2 always accumulates in the crank chamber during operation of the motor-pump aggregate. When an outlet channel 12 for the leakage fluid 13 is provided in housing 8 of pump 2, and especially an outlet means 14 is still arranged at the end of the channel remote from the eccentric 4 or the crank chamber, the said fluid 13 is allowed to discharge outwards out of the crank chamber, e.g. into a controller housing (not shown) which e.g. accommodates an electronic control unit for the motor-pump aggregate.

This drain or discharge channel 12 satisfies the requirements when the motor-pump aggregate is mounted in the manner shown in FIG. 1, e.g. into a motor vehicle. If, however, a vertical installation of the aggregate of this type is not possible, discharge of the leakage fluid 13 out of the crank chamber is impeded. This problem is encountered in particular in the installation position of the aggregate shown in FIG. 2 which is turned by 90° compared to FIG. 1. An indentation 15 in which leakage fluid 13 accumulates is preferably and favorably arranged in housing 8 at outlet channel 12.

When the projection 7 has a chamfer 16 at the periphery of its end close to indentation 15, the leakage fluid 13 can easily enter into the slot between projection 7 or holding plate 6 and pump housing 8. Preferably, this slot is provided as another channel 17 for the leakage fluid 13. Due to the fact that the projection 7 extends until into the range of motion of the coupling ring 5 according to the present invention, this further channel 17 starts at a point which is relatively far away from the motor 1 so that the inside of the motor is better protected against the ingress of leakage fluid 13 and other foreign bodies which are contained in said fluid 13.

When this further channel 17 does not extend out of the pump housing 8, it is especially advantageous that a reservoir 18 for leakage fluid 13 can be provided between the pump housing 8 and the holding plate 6 for collecting fluid 13. Alternatively, it is also possible, as shown in dotted lines in FIG. 2, to arrange a reservoir 19 for leakage fluid 13 in the inside of motor 1.

Figure 3:
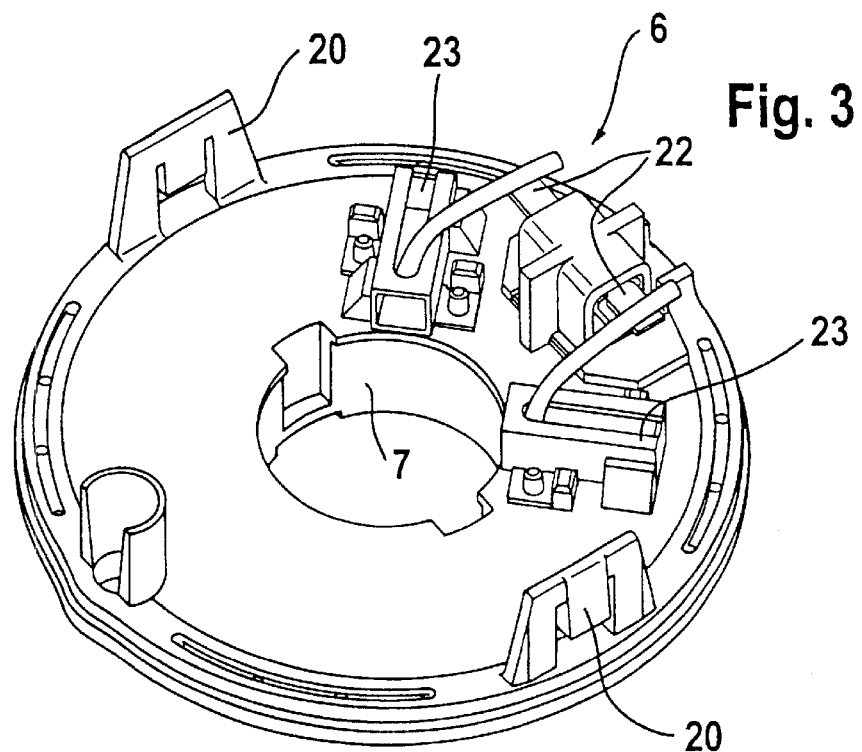
FIG. 3 is a perspective view of a holding plate of the motor-pump aggregate of the present invention.

FIG. 3 shows a perspective view of holding plate 6. Beside the projection 7 of the present invention which has been mentioned already hereinabove, the holding plate 6 in its capacity as interface between motor 1 and pump 2 preferably has a number of further advantages. Thus, a contact terminal 22 for the compensation of thermal expansions in the electric connection system and for the compensation of tolerances is arranged so as to be floatingly mounted in a housing (not shown) and directly integrated at the holding plate 6. This provides a simple electrical contacting for a straightforward electric connecting element, e.g., a cable end, at the plate 6 so that electric interferences can also be suppressed directly at the holding plate 6. Likewise, contact brush casings 23 are fitted directly at the plate 6. For connection to the housing of the motor 1, one or more catching hooks 20 may be integrated at plate 6. Furthermore, e.g. one or more injection-molded seals 21 (see FIGS. 1 and 2), e.g. from silicone, can be integrated at plate 6 which reliably prevent the ingress of foreign media from outside into the aggregate. Plate 6 may also fulfil a holding or securing function for a rotor (not referred to in detail) or a (likewise not illustrated) floating armature of motor 1 during said's transport.

Figure 4:
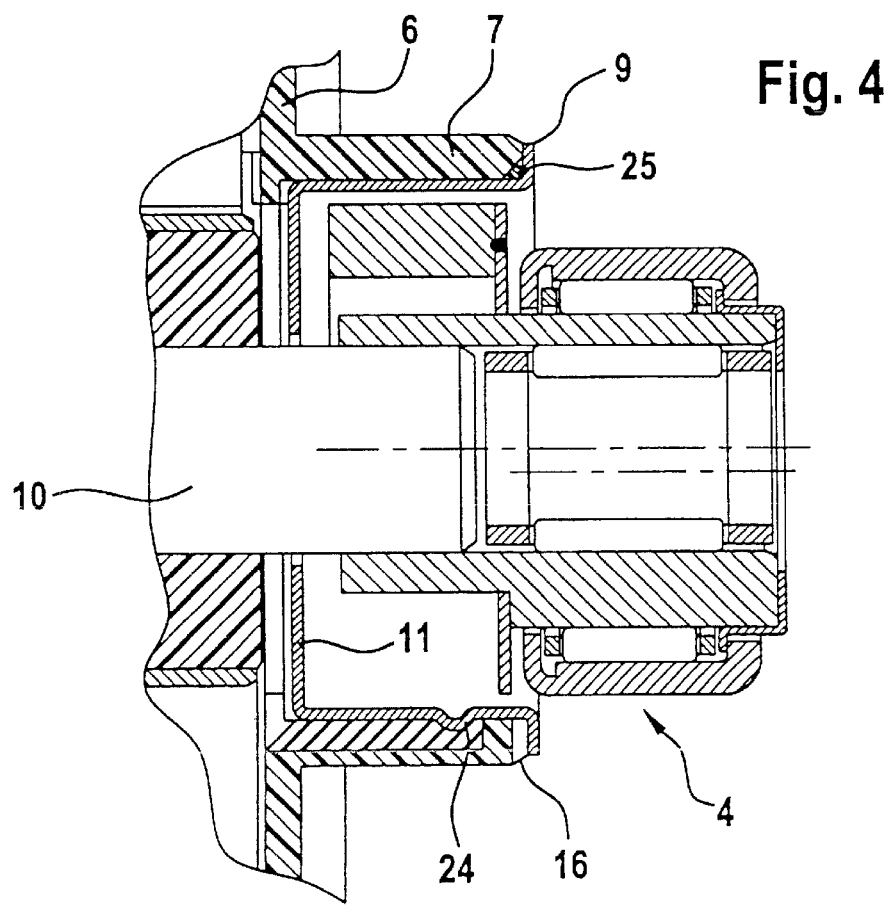
FIG. 4 is a longitudinal cross-sectional view of a detail of an alternative embodiment of the present invention.

According to the embodiment shown in FIG. 4, the fire wall 11 is designed as an independent component integrally with a separate stop 9 for the coupling ring (not shown). The connection 24 between this component 9, 11, that is preferably configured as a round sheet-metal bowl, and the projection 7 of the present invention can be established by positive and/or operative engagement, and a seal 25 can still be interposed between the projection 7 of plate 6 and the component 9, 11.

What is claimed is:

1. Motor-pump aggregate, comprising:

a motor with a shaft, a piston pump with pistons that are connected by a coupling ring, wherein the pistons are driven by way of an eccentric that is connected to the motor shaft, a holding plate disposed between said motor and said piston pump, wherein said holding plate includes contact brush casings and also includes a projection, wherein said projection extends into the range of motion of the coupling ring for achieving a stationary stop for the coupling ring.

2. Motor-pump aggregate as claimed in claim 1, wherein said projection includes a stop portion proximate said coupling ring, wherein said stop portion is made from material that is different from said projection.

3. Motor-pump aggregate as claimed in claim 2, wherein the fire wall is designed integrally with the stop portion.

4. Motor-pump aggregate as claimed in claim 1, wherein the projection has a circular design and encircles the motor shaft.

5. Motor-pump aggregate as claimed in claim 1, wherein a fire wall is arranged between the projection and the motor shaft.

6. Motor-pump aggregate as claimed in claim 5, wherein the fire wall is designed integrally with the holding plate.

7. Motor-pump aggregate as claimed in claim 1, wherein a housing of the pump includes a first outlet channel for leakage fluid, and an outlet means is arranged at the end of said first outlet channel remote from the eccentric.

8. Motor-pump aggregate as claimed in claim 7, wherein the housing includes an indentation at the first outlet channel.

9. Motor-pump aggregate as claimed in claim 8, wherein the projection has a chamfer at the outside periphery of its end facing the indentation.

10. Motor-pump aggregate as claimed in claim 7, further including a second outlet channel for leakage fluid residing between the projection and the housing.

11. Motor-pump aggregate as claimed in claim 10, wherein a reservoir for leakage fluid is provided between the housing and the holding plate.

12. Motor-pump aggregate as claimed in claim 7, wherein a second outlet channel resides between the holding plate and the housing.

13. Motor-pump aggregate as claimed in claim 12, wherein a reservoir for leakage fluid is provided in a compartment of the motor.

* * * * *